United States Patent
Li et al.

(10) Patent No.: US 9,705,554 B2
(45) Date of Patent: Jul. 11, 2017

(54) CIRCUITS, DEVICES AND METHODS FOR ACHIEVING FAST CHANGES IN VOLTAGE REGULATOR OUTPUTS

(71) Applicant: SKYWORKS SOLUTIONS, INC., Woburn, MA (US)

(72) Inventors: Thomas Zoki Li, Mountain View, CA (US); Lui Lam, Lexington, MA (US); Ghader Razmafrouz, Mountain View, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 14/753,960

(22) Filed: Jun. 29, 2015

(65) Prior Publication Data
US 2016/0179112 A1 Jun. 23, 2016

Related U.S. Application Data

(60) Provisional application No. 62/019,432, filed on Jul. 1, 2014.

(51) Int. Cl.
*H01Q 11/12* (2006.01)
*H04B 1/04* (2006.01)
*H04B 1/40* (2015.01)
*G05F 1/46* (2006.01)

(52) U.S. Cl.
CPC ...... *H04B 1/40* (2013.01); *G05F 1/46* (2013.01)

(58) Field of Classification Search
CPC .... G05F 1/10; G05F 1/46; H02M 2001/0006; H02M 2001/0096; H04B 1/40
See application file for complete search history.

(56) References Cited

U.S. PATENT DOCUMENTS

| | | | |
|---|---|---|---|
| 7,821,244 B1 * | 10/2010 | Signoretti | H02M 3/158 323/271 |
| 2010/0264890 A1 | 10/2010 | Caldwell | |
| 2011/0309679 A1 * | 12/2011 | Fisher | H02J 1/04 307/33 |
| 2012/0074923 A1 | 3/2012 | Tran et al. | |
| 2014/0002187 A1 | 1/2014 | McPartlin et al. | |

(Continued)

FOREIGN PATENT DOCUMENTS

WO     2005112240 A2     11/2005

OTHER PUBLICATIONS

International Search Report and Written Opinion for PCT/US2015/038326 dated Oct. 27, 2015.

*Primary Examiner* — Nguyen Vo
(74) *Attorney, Agent, or Firm* — Chang & Hale LLP

(57) ABSTRACT

Circuits, devices and methods for achieving fast changes in voltage regulator outputs. In some embodiments, a voltage regulation system can include a voltage regulator configured to receive an input voltage Vin and generate an output voltage Vout at an output node, and to transition Vout between V1 and V2. The voltage regulation system can further include a transition circuit coupled to the output node. The transition circuit can include a first voltage source that is switchably coupled to the output node and configured to provide a voltage associated with one of the V1 and V2 voltages to the output node during at least the transition of the voltage regulator. The voltage provided by the first voltage source can be substantially equal to one of the V1 and V2 voltages.

20 Claims, 12 Drawing Sheets

(56) References Cited

U.S. PATENT DOCUMENTS

2014/0077780 A1  3/2014 Toshiba
2015/0234403 A1* 8/2015 Siao ........................ G05F 1/575
                  323/280
2015/0288192 A1* 10/2015 Wang ................... H02M 3/158
                  307/52

\* cited by examiner

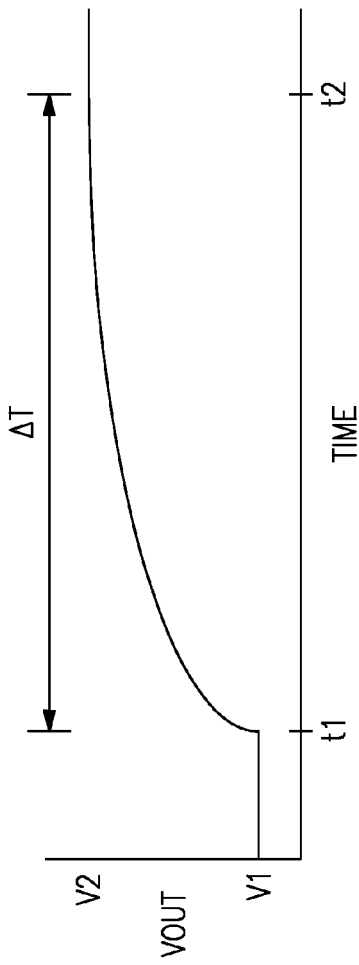
FIG.1A
FIG.1B
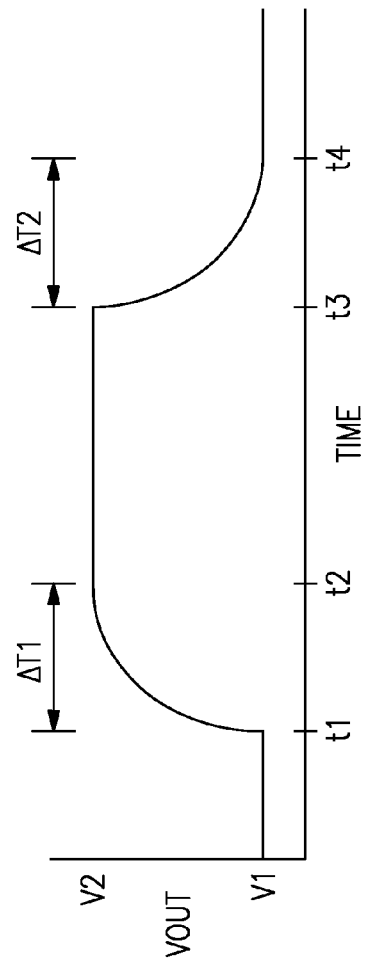
FIG.2A
FIG.2B

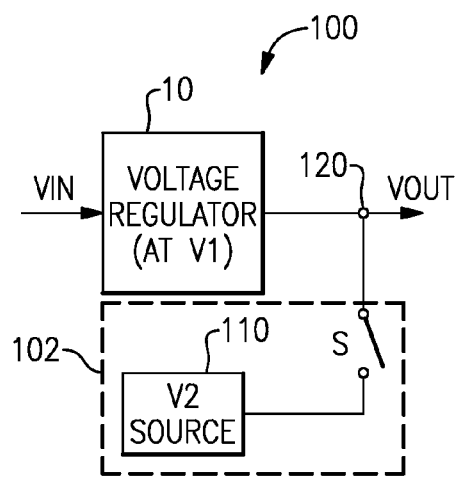
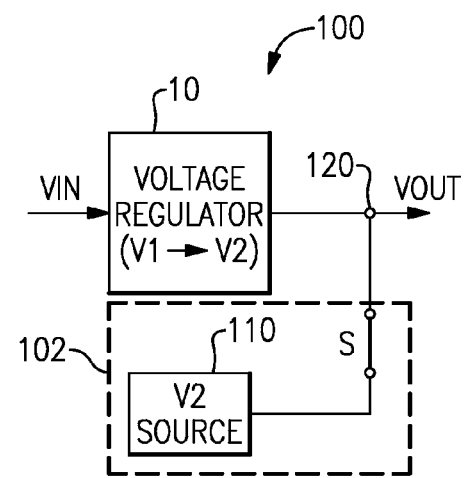
FIG.3A  FIG.3B
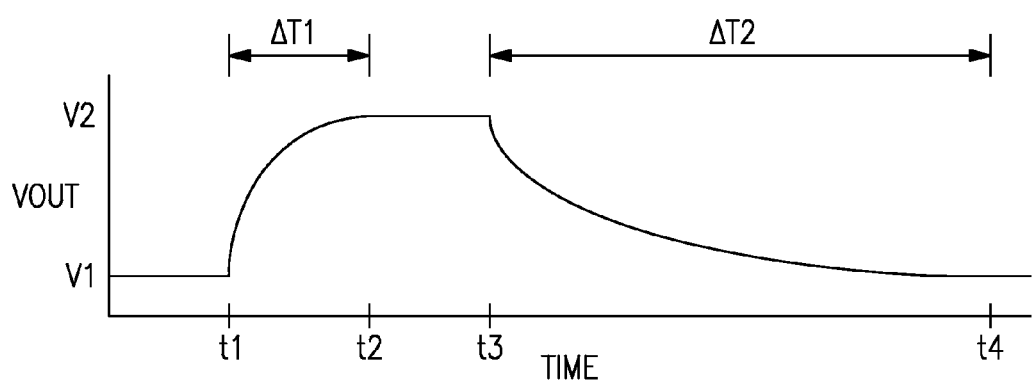
FIG.3C

CIRCUITS, DEVICES AND METHODS FOR ACHIEVING FAST CHANGES IN VOLTAGE REGULATOR OUTPUTS

CROSS-REFERENCE TO RELATED APPLICATION(S)

This application claims priority to U.S. Provisional Application No. 62/019,432 filed Jul. 1, 2014, entitled CIRCUITS, DEVICES AND METHODS FOR PROVIDING FAST CHANGES IN VOLTAGE REGULATOR OUTPUTS, the disclosure of which is hereby expressly incorporated by reference herein in its entirety.

BACKGROUND

Field

The present disclosure relates to voltage regulators capable of achieving fast changes in outputs.

Description of the Related Art

In many electronic applications, an input voltage can be stepped up or stepped down to a desired output voltage. Generation of such an output voltage can be achieved by a voltage regulator.

SUMMARY

In accordance with some implementations, the present disclosure relates to a voltage regulation system that includes a voltage regulator configured to receive an input voltage Vin and generate an output voltage Vout at an output node. The voltage regulator is further configured to transition Vout between V1 and V2. The voltage regulation system further includes a transition circuit coupled to the output node. The transition circuit includes a first voltage source that is switchably coupled to the output node. The first voltage source is configured to provide a voltage associated with one of the V1 and V2 voltages to the output node during at least the transition of the voltage regulator.

In some embodiments, the voltage provided by the first voltage source can be substantially equal to one of the V1 and V2 voltages. The first voltage source can be further configured to continue to provide the voltage to the output node when the transition of Vout of the voltage regulator is substantially complete.

In some embodiments, the second value V2 can be greater than the first value V1. The first voltage source can be configured to provide the V2 voltage to the output node during a step-up transition from V1 to V2.

In some embodiments, the transition circuit can further include a second voltage source that is switchably coupled to the output node. The second voltage source can be configured to provide the V1 voltage to the output node during a step-down transition from V2 to V1.

In some embodiments, each of the first voltage source and the second voltage source can include a capacitance regulated by a low-dropout (LDO) regulator such that the capacitance is pre-charged to a respective voltage by the LDO regulator. The LDO regulator of the first voltage source can include an output of, for example, approximately 5.0V, and the LDO regulator of the second voltage source includes an output of, for example, approximately 2.5V. Other values of output voltages can also be utilized.

In some embodiments, the voltage regulator can include a buck regulator having an output inductance and an output capacitance. The output capacitance can be configured to couple the output node to ground. In some embodiments, each LDO-regulated capacitance can be greater than the output capacitance. In some embodiments, each LDO-regulated capacitance can be greater than the output capacitance by a factor of, for example, 10 or more.

Each LDO-regulated capacitance being greater than the output capacitance can allow Vout to reach a target voltage of V2 or V1 substantially faster than by the transition of the voltage regulator. The faster reaching of V2 or V1 for Vout can be achieved without involving a large current through the output inductance. The faster reaching of V2 or V1 for Vout can be achieved in approximately 2 µs or less for a transition involving a voltage change of at least 2.5V. Such a transition can involve, for example, a change between V2=5.0V and V1=2.5V.

In some embodiments, the first voltage source can be connected to the output node and the second voltage source can be disconnected from the output node when the voltage regulator is outputting V2 as Vout. The first voltage source can be connected to the output node and the second voltage source can be disconnected from the output node when the voltage regulator transitions from V1 to V2.

In some embodiments, the first voltage source can be disconnected from the output node and the second voltage source can be connected to the output node when the voltage regulator is outputting V1 as Vout. The first voltage source can be disconnected from the output node and the second voltage source can be connected to the output node when the voltage regulator the voltage regulator transitions from V2 to V1.

In some embodiments, the voltage regulation system can be configured to provide Vout as a supply voltage for one or more power amplifiers (PAs). In some embodiments, the voltage regulation system can be configured to provide Vout for other applications.

According to a number of teachings, the present disclosure relates to a method for regulating voltage. The method includes receiving an input voltage Vin by a voltage regulator and generating an output voltage Vout at an output node. The method further includes receiving a control signal to transition Vout between V1 and V2. The method further includes operating the voltage regulator to effectuate the transition of Vout between V1 and V2. The method further includes providing a voltage associated with one of the V1 and V2 voltages from a transition circuit to the output node during at least the transition of the voltage regulator.

In some embodiments, the providing of the voltage can include providing a voltage that is substantially equal to one of the V1 and V2 voltages. The providing of one of the V1 and V2 voltages from the transition circuit to the output node can result in a faster transition of Vout than a transition of the voltage regulator without the voltage provided by the transition circuit.

In a number of implementations, the present disclosure relates to a voltage regulation device that includes a substrate and a regulation circuit implemented on the substrate. The regulation circuit includes a voltage regulator configured to receive an input voltage Vin and generate an output voltage Vout at an output node, and to transition Vout between V1 and V2. The regulation circuit further includes a transition circuit coupled to the output node. The transition circuit includes a first voltage source that is switchably coupled to the output node. The first voltage source is configured to provide a voltage associated with one of the V1 and V2 voltages to the output node during at least the transition of the voltage regulator.

According to some implementations, the present disclosure relates to a power management integrated circuit (PMIC) module that includes a packaging substrate configured to receive a plurality of components, and a voltage regulation circuit implemented on the packaging substrate. The regulation circuit includes a voltage regulator configured to receive an input voltage Vin and generate an output voltage Vout at an output node, and to transition Vout between V1 and V2. The regulation circuit further includes a transition circuit coupled to the output node. The transition circuit includes a first voltage source that is switchably coupled to the output node. The first voltage source is configured to provide a voltage associated with one of the V1 and V2 voltages to the output node during at least the transition of the voltage regulator.

In some implementations, the present disclosure relates to a wireless device that includes a transceiver configured to process RF signals, and an antenna in communication with the transceiver and configured to facilitate transmission and receiving of respective RF signals. The wireless device further includes a voltage regulation circuit implemented to regulate a voltage signal that facilitates the transmission and/or receiving of the RF signals. The regulation circuit includes a voltage regulator configured to receive an input voltage Vin and generate an output voltage Vout at an output node, and to transition Vout between V1 and V2. The regulation circuit further includes a transition circuit coupled to the output node. The transition circuit includes a first voltage source that is switchably coupled to the output node. The first voltage source is configured to provide a voltage associated with one of the V1 and V2 voltages to the output node during at least the transition of the voltage regulator.

In some embodiments, the wireless device can further include a power amplifier configured to amplify an RF signal for transmission. The PA can be configured to receive a supply voltage based on the output voltage of the voltage regulation circuit.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 1A shows a block diagram of a voltage regulator configured to receive an input voltage Vin and generate an output voltage Vout.

FIG. 1B shows an example transition of the output voltage Vout in the voltage regulator of FIG. 1A.

FIG. 2A shows a block diagram of a voltage regulation configuration having a transition circuit coupled to an output of a voltage regulator.

FIG. 2B shows an example plot of an output voltage Vout of the voltage regulation configuration of FIG. 2A as a function of time during a low-to-high transition and a high-to-low transition.

FIGS. 3A-3C show an example where a voltage regulation configuration includes a voltage regulator and a V2 source sharing a common output node.

DETAILED DESCRIPTION OF SOME EMBODIMENTS

Figure 4A:
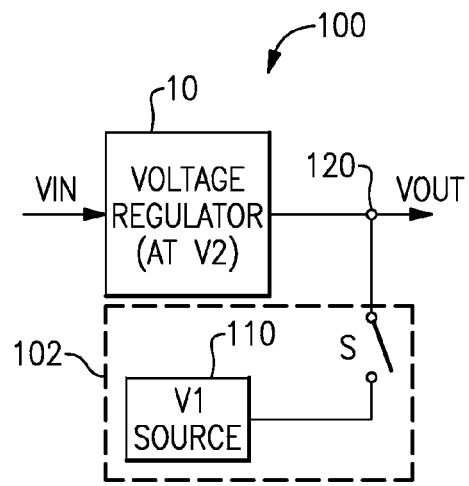
FIGS. 4A-4C show an example where a voltage regulation configuration includes a V1 source being utilized alone, without a V2 source, in manners similar to the V2 source of FIGS. 3A-3C.

The headings provided herein, if any, are for convenience only and do not necessarily affect the scope or meaning of the claimed invention.

Voltage regulators are utilized in many applications where stable voltage levels are desired. Such a voltage level can be obtained as an output of a voltage regulator that receives an input voltage such as a battery voltage. Such a voltage regulator can be operated to change its output level by, for example, a feedback control loop.

FIG. 1A shows a block diagram of a voltage regulator 10 configured to receive an input voltage Vin and generate an output voltage Vout. Suppose that the voltage regulator 10 receives a control signal to change its output voltage level from V1 to a higher level V2. As shown in FIG. 1B, the voltage regulator 10 can initiate a transition to V2 at time t1, and generally complete the transition at time t2. Accordingly, $\Delta T=t2-t1$ can be considered to be the time required to transition the output voltage from V1 to V2. Similar transition can be carried out to reduce the output voltage (e.g., from V2 to V1).

In some applications, output voltage transitions effectuated by voltage regulators such as the example of FIGS. 1A and 1B may not be fast enough. For example, in some wireless access point (WAP) applications, it is desirable for a power amplifier (PA) to operate at different power levels. Such a PA in a wireless device can operate at full or higher power with a maximum or higher supply voltage (e.g., about 5V) to support high data rate. However, when the wireless device is relatively close to another device such as a router, such full or higher power operation can be wasteful.

By changing the supply voltage of the PA when the wireless device is relatively close to the other device, or in other situations where the full or higher power is not needed or desired, higher operating efficiency can be achieved. However, such a change in supply voltage of the PA typically needs to be achieved relatively fast. For example, it is desirable to perform a supply voltage change in about 2 μs or less when switching between low and high supply voltages associated with low and high power modes. Similar fast transition between high and low supply voltages is also desirable.

Described herein are various examples for providing fast transitions in voltage supply levels without compromising output ripple performance and efficiency. Although some of the examples are described in the context of such voltage supplies being utilized for power amplifiers, it will be understood that one or more features of the present disclosure can also be utilized in other applications associated with wireless devices, as well as non-wireless applications.

FIG. 2A shows a block diagram of a voltage regulation configuration 100 having a transition circuit 102 coupled to an output of a voltage regulator 10 such as the example of FIG. 1A. The voltage regulator 10 is shown to receive an input voltage Vin and generate an output voltage Vout. As described herein, the transition circuit 102 can be configured such that a voltage transition can be effectuated much faster than the example of FIG. 1. For the purpose of description, the voltage regulation configuration 100 is described in the context of the voltage regulator 10 (e.g., a conventional voltage regulator) in combination with the transition circuit 102. However, it will be understood that both of such components may be included in, and be referred to herein as, a voltage regulator 100.

FIG. 2B shows a plot of Vout as a function of time during a low-to-high transition between V1 and V2, and a high-to-low transition between V2 and V1. At time t1, the low-to-high transition is shown to be initiated, and such a transition is shown to be generally completed at time t2. Accordingly, $\Delta T1=t2-t1$ can be considered to be the time taken to transition Vout from V1 to V2. At time t3, the high-to-low transition is shown to be initiated, and such a transition is shown to be generally completed at time t4. Accordingly, $\Delta T2=t4-t3$ can be considered to be the time taken to transition Vout from V2 to V1. As described herein, each of either or both of $\Delta T1$ and $\Delta T2$ can be less than or equal to about 2 μs when transitioning between example output voltage values of 2.5V and 5.0V.

It will be understood that V1 and V2 can have other values than the examples of 2.5V and 5.0V. It will also be understood that the voltage regulation configuration 100 does not necessarily need to have both of the upward and downward voltage transitions be fast. For example, the upward transition (e.g., V1 to V2) can be fast while the downward transition (e.g., V2 to V1) is slower similar to the example of FIGS. 1A and 1B. In another example, the downward transition (e.g., V2 to V1) can be fast while the upward transition (e.g., V1 to V2) is slower similar to the example of FIGS. 1A and 1B. It will also be understood that, while various examples are described herein in the context of transitions among two voltage levels, one or more features of the present disclosure can also be implemented in applications involving transitions among more than two voltage levels.

In some embodiments, the transition circuit 102 of FIG. 2A can include one or more voltage sources switchably coupled to the output node of the voltage regulator 10. A given one of such voltage source(s) can be configured to provide a voltage that is substantially the same as one of the output voltages of the voltage regulator 10. FIGS. 3-5 show examples of how such voltage source(s) can be utilized in conjunction with the voltage regulator 10 to facilitate faster transitions in Vout.

FIGS. 3A-3C show an example where a voltage regulation configuration 100 includes a voltage regulator 10 and a V2 source 110 sharing a common output node 120. The V2 source 110 can be configured to provide a voltage of V2 which is one of the output values of the voltage regulator 10. The V2 source 110 is shown to be coupled to the output node 120 through a switch S; and such a switch can be ON or OFF depending on the operating mode of the voltage regulator 10.

For example, when the voltage regulator 10 is outputting a voltage of V1 (FIG. 3A), the switch S can be turned OFF such that the voltage V2 from the V2 source 110 is disconnected from the output node 120. Accordingly, Vout can be maintained at V1 as provided by the voltage regulator 10.

In another example, when the voltage regulator 10 is undergoing a transition from V1 to V2 (FIG. 3B), the switch S can be turned ON such that the voltage V2 from the V2 source 110 is provided to the output node 120. As described herein, such a voltage from the V2 source 110 can allow the voltage level at the output node 120 to reach the value of V2 much faster.

When the voltage regulator 10 is outputting a voltage of V2, the switch S can remain ON such that the voltage V2 from the V2 source 110 is provided to the output node 120. Because both of the voltage regulator 10 and the V2 source 110 are outputting substantially the same voltage (V2), the output node 120 can be held at V2. In some embodiments, the V2 source 110 can be disconnected from the output node 120 (e.g., by turning OFF the switch S) once the output of the voltage regulator 10 is substantially at V2.

In the example of FIGS. 3A and 3B, the presence and operation of the V2 source allows the V1-to-V2 transition to be implemented much faster than the feedback-based adjustment of the voltage regulator 10. However, because the example configuration 100 does not include a V1 source, a V2-to-V1 transition needs to be implemented by the voltage regulator 10 alone. Accordingly, the V2-to-V1 transition is relatively slower than the V1-to-V2 transition facilitated by the V2 source. Such different speeds in transitions are depicted in FIG. 3C, where $\Delta T1$ corresponds to the V1-to-V2 transition and $\Delta T2$ corresponds to the V2-to-V1 transition.

Figure 4B:
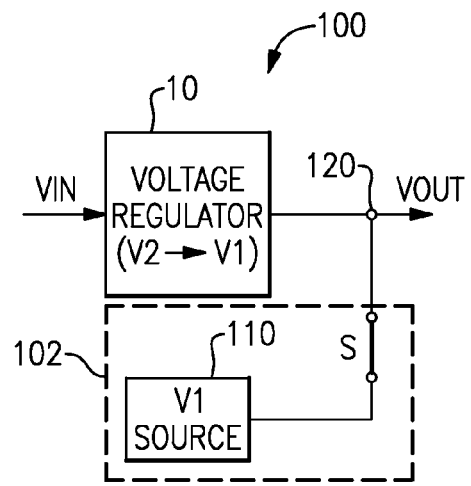
Figure 4C:
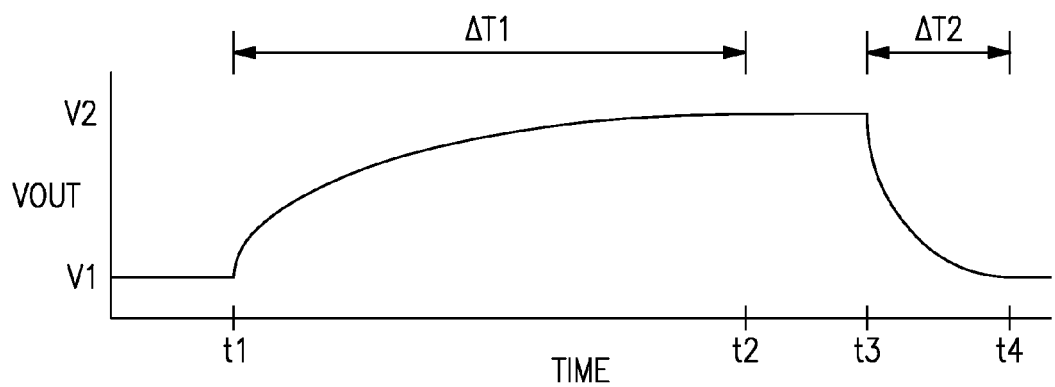

FIGS. 4A-4C show an example where a voltage regulation configuration 100 includes a V1 source 110 being utilized alone (without a V2 source) in manners similar to the V2 source of FIGS. 3A-3C. Accordingly, and as shown in FIG. 4C, a V1-to-V2 transition ($\Delta T1$) is much slower than a V2-to-V1 transition ($\Delta T2$) facilitated by the V1 source.

FIGS. 5A-5E show an example where a voltage regulation configuration 100 includes a V2 source 110a and a V1 source 110b. The V2 source 110a is shown to be coupled to a common output node 120 through a switch S2, and the V1 source 110b is shown to be coupled to the common output node 120 through a switch S1. The two switches S2 and S1 can be operated to connect and disconnect the V2 source 110a and V1 source 110b, respectively, to and from the common output node 120.

Figure 5A:
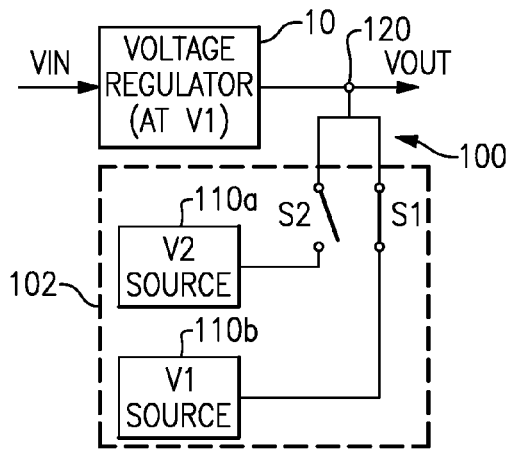
FIGS. 5A-5E show an example where a voltage regulation configuration includes a V2 source and a V1 source.

For example, FIG. 5A shows a configuration where the voltage regulator 10 is outputting V1. In such a state, the switch S2 can be turned OFF to disconnect the V2 source 110a from the output node 120, and the switch S1 can be turned ON to connect the V1 source 110b to the output node 120. Similarly, FIG. 5C shows a configuration where the voltage regulator 10 is outputting V2. In such a state, the switch S1 can be turned OFF to disconnect the V1 source 110*b* from the output node 120, and the switch S2 can be turned ON to connect the V2 source 110*a* to the output node 120.

Figure 5B:
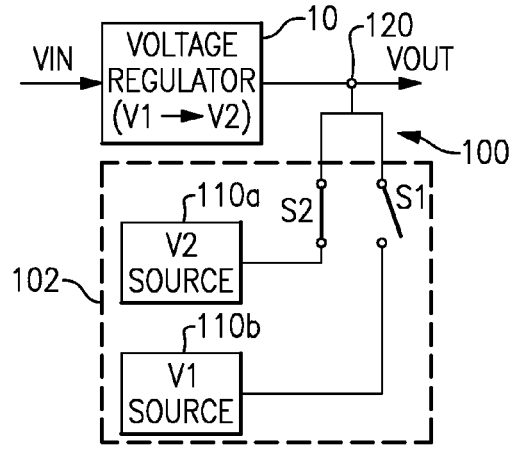
Figure 5C:
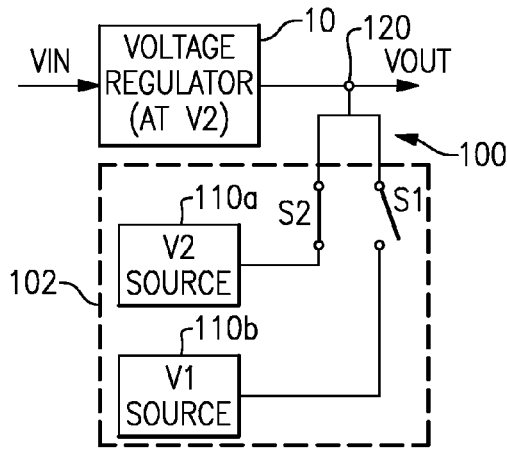
Figure 5D:
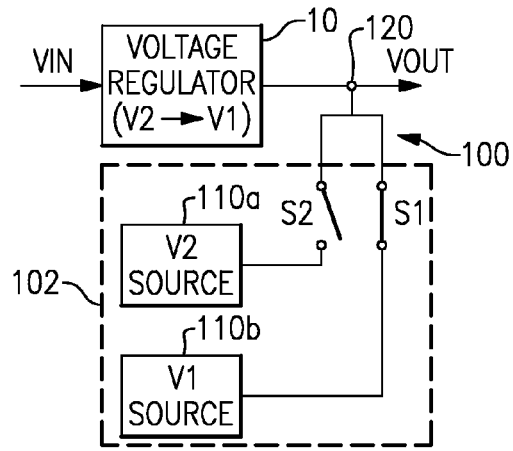
Figure 5E:
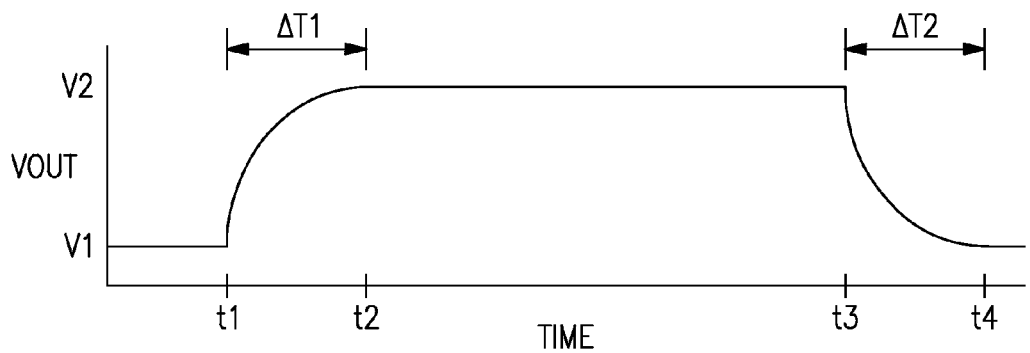

FIG. 5B shows a configuration where the voltage regulator 10 is changing its output from V1 to V2. In such a transition state, the switch S1 can be turned OFF to disconnect the V1 source 110*b* from the output node 120, and the switch S2 can be turned ON to connect the V2 source 110*a* to the output node 120. Similarly, FIG. 5D shows a configuration where the voltage regulator 10 is changing its output from V2 to V1. In such a transition state, the switch S2 can be turned OFF to disconnect the V2 source 110*a* from the output node 120, and the switch S1 can be turned ON to connect the V1 source 110*b* to the output node 120. Based on the foregoing example, and as shown in FIG. 5E, one can see that both of the V1-to-V2 transition and the V2-to-V1 transition can be achieved relatively fast.

Figure 6:
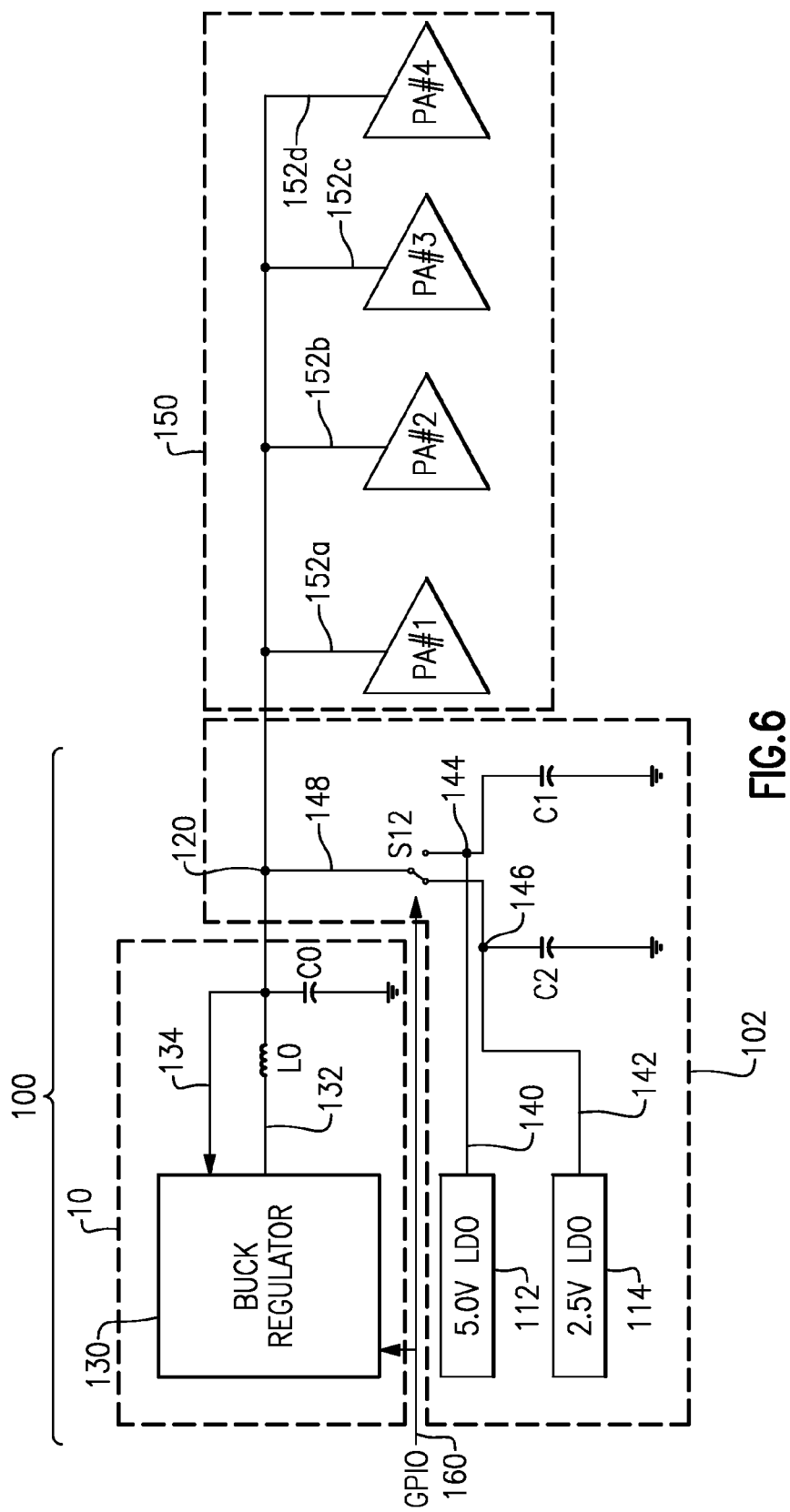
FIG. 6 shows a voltage regulation configuration that can be a more specific example of the voltage regulation configuration of FIGS. 5A-5E.

FIG. 6 shows a voltage regulation configuration 100 that can be a more specific example of the voltage regulation configuration 100 of FIGS. 5A-5E. In the example of FIG. 6, the voltage regulation configuration 100 is depicted as being utilized to provide a supply voltage to a plurality power amplifiers (PAs). Such a supply voltage is described as being either a 5.0V voltage or a 2.5V voltage; however, it will be understood that other voltage values can also be utilized.

In FIG. 6, the voltage regulation configuration 100 is shown to include a voltage regulator 10 being a buck regulator 130. Although described in the context of such a buck regulator, it will be understood that one or more features of the present disclosure can also be implemented in other types of regulators. The buck regulator 130 is shown to be coupled to an output node 120 through an inductance L0 along a path 132; and the output node 120 is shown to be coupled to ground through a capacitance C0.

Although not shown, such a buck regulator typically includes two switches between an input voltage (Vin) node and ground, and one end of the inductance L0 can be connected to a node between the two switches. Such switches can be operated appropriately to control charging and discharging of the inductance L0. For example, the first switch on the Vin node side can be turned on while the second switch on the ground side is turned off to provide Vin to the inductance L0 thereby charging the same and generating an increasing inductive current. When the first switch is turned off and the second switch is turned on, connection from Vin to the inductance L0 is removed thereby discharging the same and generating a decreasing inductive current. Such charging and discharging of the inductance L0 can repeat by appropriate control signals to the first and second switches. The resulting inductive currents that increase and decrease with the charging and discharging of the inductance L0 can charge and discharge the capacitance C0, to thereby maintain a desired DC voltage Vout at the output node 120.

In the example of FIG. 6, a feedback control loop 134 can be provided between the output node 120 and the buck regulator 130. Although not shown, such a feedback can be configured to compare the output voltage Vout to a reference level representative of a desired output voltage. If the actual value of Vout deviates from the reference level, the foregoing charging and discharging operations can be adjusted to adjust Vout.

When the output voltage changes (e.g., from 2.5V to 5.0V), voltage regulators such as the buck regulator 130 of FIG. 6 typically needs to undergo the foregoing feedback based adjustment to effectuate the output voltage transition. As described herein, such a feedback based transition can be relatively slow.

As described herein, and as shown in the example of FIG. 6, a transition circuit 102 can be implemented to allow such output voltage transitions to occur much faster. For example, one or more separate voltage sources can be provided as described in reference to FIGS. 3-5. In FIG. 6, a 5.0V source and a 2.5V source are depicted as being switchably coupled to the output node 120. The 5.0V source can include a capacitance C1 regulated to 5.0V by a low-dropout (LDO) regulator 112. Similarly, the 2.5V source can include a capacitance C2 regulated to 2.5V by an LDO regulator 114.

In FIG. 6, the capacitance C1 is shown to switchably couple the output node 120 to ground. Similarly, the capacitance C2 is shown to switchably couple the output node 120 to ground. Such switching functionalities associated with C1 and C2 can be provided by a switch S12. Such a switch can include, for example, two separate switches similar to the example of FIGS. 5A-5D. Such a switch is preferably a low-impedance switch.

Accordingly, when the 2.5V output is desired, the switch S12 can be in a state that connects the capacitance C2 to the output node 120, and disconnects the capacitance C1 from the output node 120. Similarly, when the 5.0V output is desired, the switch S12 can be in a state that connects the capacitance C1 to the output node 120, and disconnects the capacitance C2 from the output node 120.

When a 2.5V-to-5.0V transition is desired, the switch S12 can be switched from the foregoing 2.5V mode to the 5.0V mode, such that the capacitance C1 is connected to the output node 120 and C2 is disconnected from the output node 120. When such a connection is made between C1 and the output node, the pre-charged capacitance C1 can provide a quick boost in the output voltage to the target value of 5.0V, thereby resulting in a fast transition.

When a 5.0V-to-2.5V transition is desired, the switch S12 can be switched from the 5.0V mode to the 2.5V mode, such that the capacitance C2 is connected to the output node 120 and C1 is disconnected from the output node 120. When such a connection is made between C2 and the output node, the capacitance C2 (pre-charged to a lower voltage than the output node voltage) can be charged from the output node 120 relatively quickly to thereby lower the output voltage to the target value of 2.5V, thereby resulting in a fast transition.

In the example of FIG. 6, the output voltage regulated in the foregoing manner is shown to be provided to a power amplifier (PA) circuit 150. Such a PA circuit can include one or more PAs, and each of such PAs can be provided with the output voltage of the voltage regulation configuration 100, from the output node 120 and through its corresponding supply line 152. For example, four PAs are depicted as receiving supply voltages through their respective supply lines 152*a*-152*d*.

In the example of FIG. 6, the operation of the buck regulator 130 and the switch S12 can be facilitated by control signals transmitted through, for example, GPIO control lines 160. Examples of processes that involve such control signals are described herein in greater detail.

In the example of FIG. 6, the capacitance C0 at the output of the buck regulator 10 can have a value of, for example, approximately 1 µF. Although not shown, each of the PAs can have a bypass capacitance of, for example, about 0.1 µF or less. In the context of such capacitance values, each of the capacitances C1 and C2 of the transition circuit 102 can have a value of, for example, 10 µF. With such a relatively large value, C1 and C2 can be pre-charged in a regulated manner by their respective LDOs, and be utilized to facilitate very fast transition of Vout with minimal amount of current.

As described herein, the example architecture of FIG. 6 can achieve an output voltage step-up transition from Vout of 2.5V to 5.0V in less than 2 μs. The same architecture can achieve an output voltage step-down transition from Vout of 5.0V to 2.5V in less than 2 μs as well.

It is noted that by switching between two (or more) pre-charged capacitances (e.g., 10 uF capacitors) of the transition circuit 102, transitions between the two (or more) preset voltages can be achieved much faster than trying to change the output voltage with a single relatively large capacitance (e.g., C0 having a value of 10 μF) at the output node. Further, the amount of current involved in changing the output voltage on such a single capacitance in a short period of time (e.g., 2 μs) can be quite high and can necessitate a corresponding inductance with a much higher saturation current. Such a requirement on the inductance in turn generally necessitates a physically larger and more expensive inductor. In the example architecture of FIG. 6, reliability can be improved because high current spikes can be avoided as well.

Figure 7:
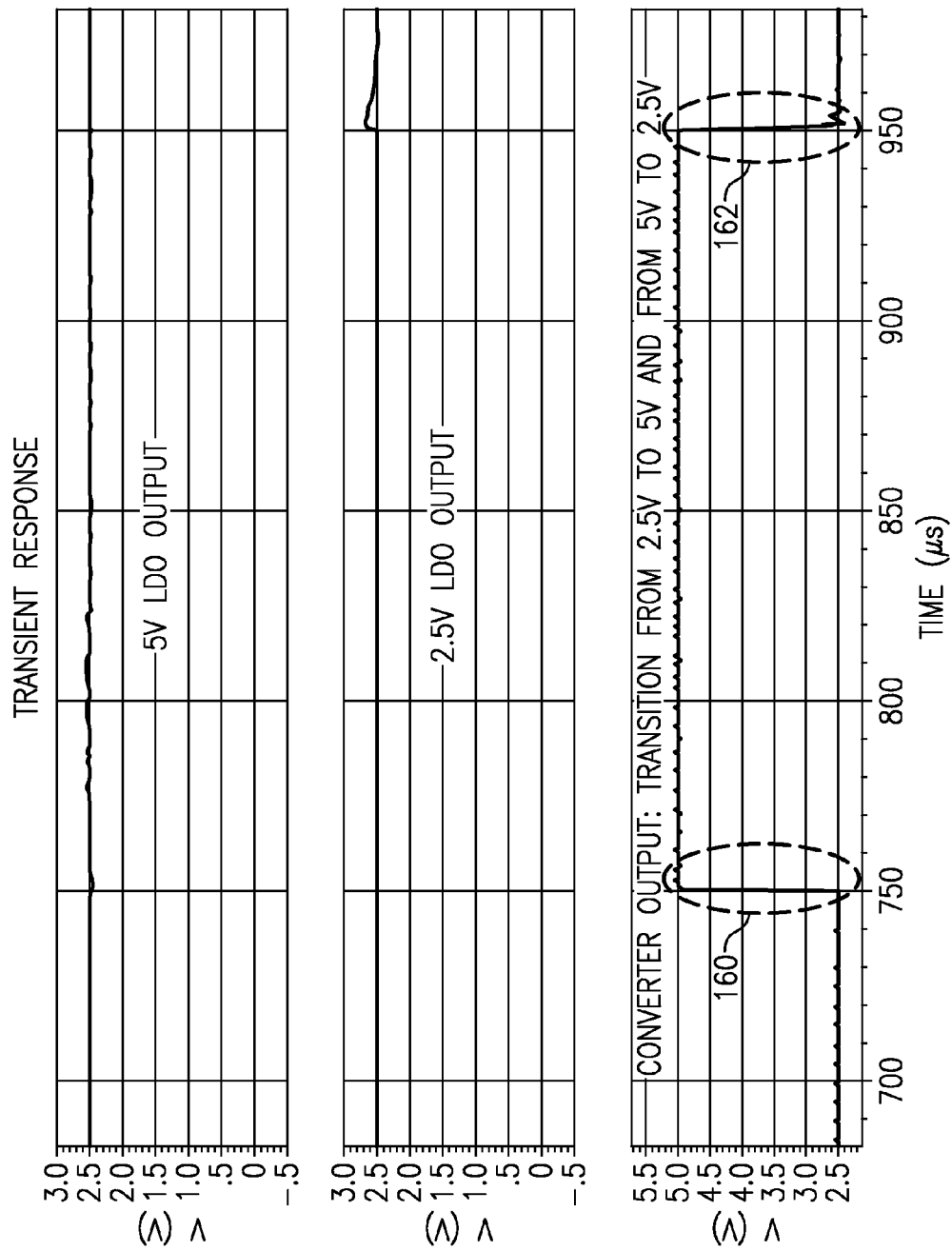
FIG. 7 shows example voltage traces of 5.0V LDO output, 2.5V LDO output, and Vout during transitions involving 2.5V-to-5.0V and 5.0V-to-2.5V for the example architecture of FIG. 6.
Figure 8:
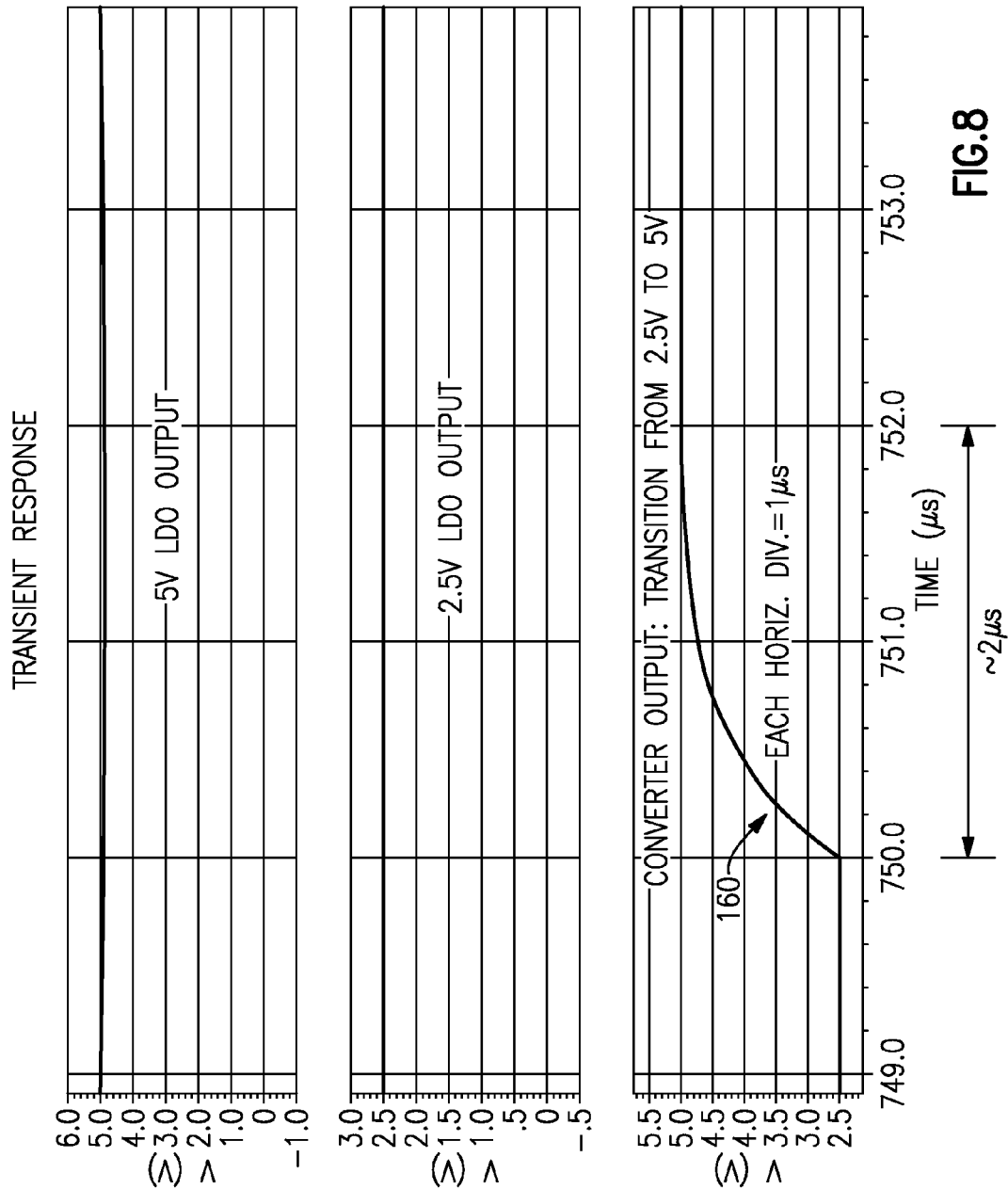
FIG. 8 shows enlarged views of the 2.5V-to-5.0V transition portion of the example of FIG. 7.
Figure 9:
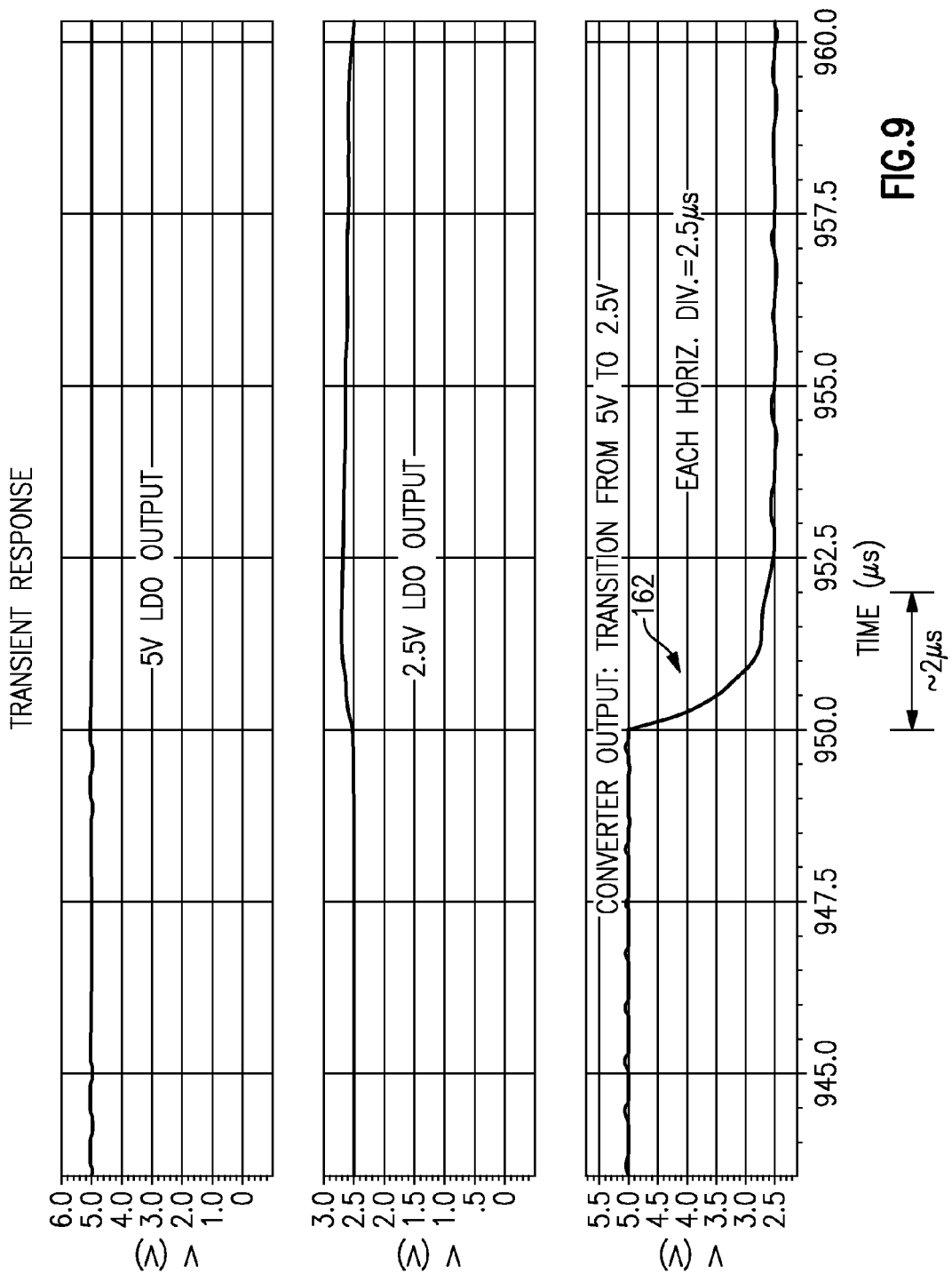
FIG. 9 shows enlarged views of the 5.0V-to-2.5V transition portion of the example of FIG. 7.
Figure 10:
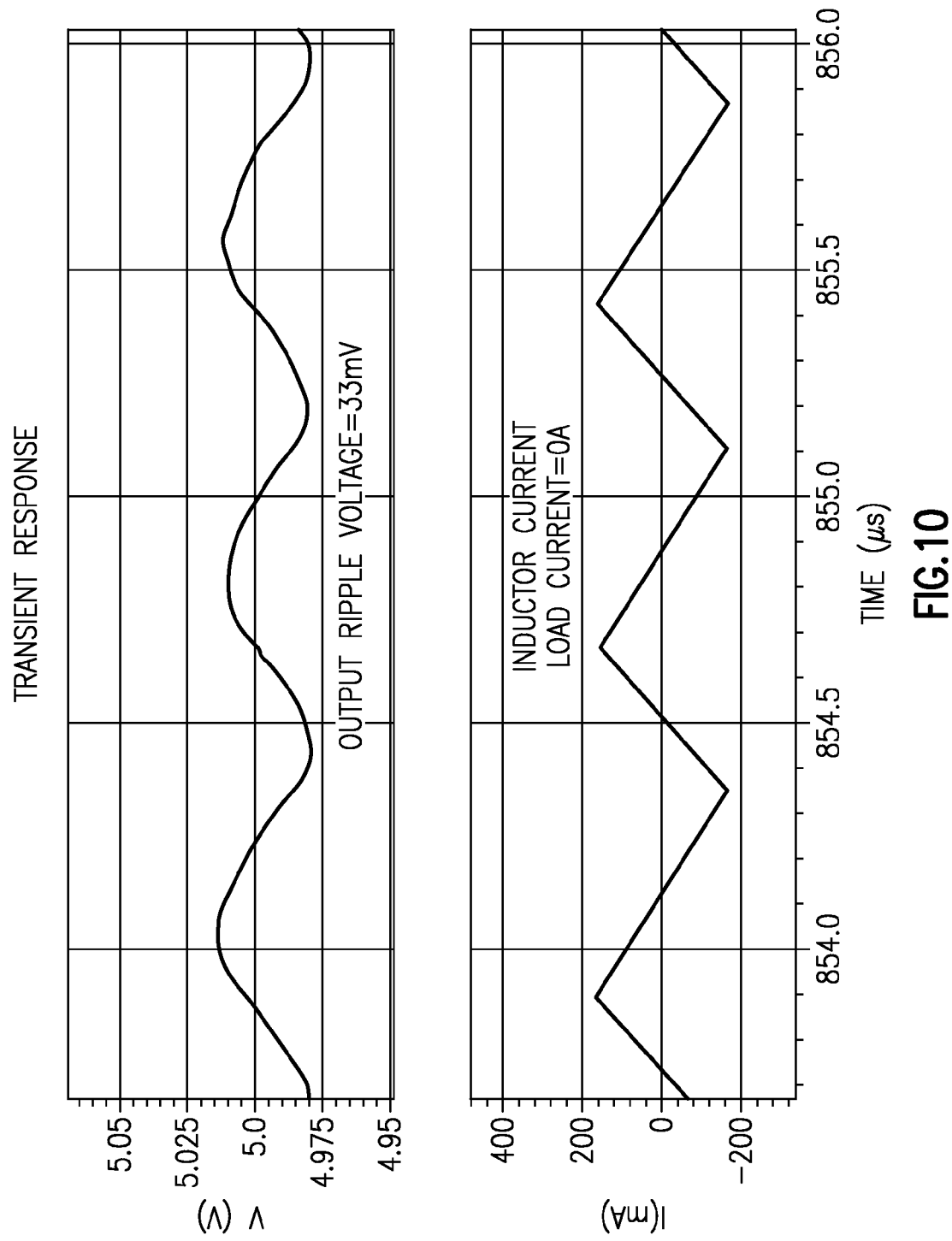
FIG. 10 shows example traces of an inductance current and an output ripple voltage as a function of time for the example of FIG. 6.

FIGS. 7-9 show examples of voltage traces of the 5.0V LDO output, 2.5V LDO output, and Vout during transitions involving 2.5V-to-5.0V and 5.0V-to-2.5V for the example architecture of FIG. 6. FIGS. 8 and 9 show the former and latter transitions, respectively, with smaller time scales for better details of the transitions. FIG. 10 show an example of ripple voltage that can be expected in the example architecture of FIG. 6.

In FIG. 7, the 2.5V-to-5.0V transition is indicated as 160, and the 5.0V-to-2.5V transition is indicated as 162. During the 2.5V-to-5.0V transition 160, switching in of the capacitance C1 is shown to result in the 5.0V LDO output to dip slightly; however, the LDO is shown to compensate relatively quickly back to the 5.0V level. Similarly, during the 5.0V-to-2.5V transition 162, switching in of the capacitance C2 is shown to result in the 2.5V LDO output to increase slightly; however, the LDO is shown to compensate relatively quickly back to the 2.5V level.

FIG. 8 shows the 2.5V-to-5.0V transition 160 in an enlarged view. One can see that the step-up transition is substantially completed in approximately 2 μs or less. One can also see that the 5.0V LDO's recovery back to the 5.0V level is relatively fast, at about 2.5 μs or less.

FIG. 9 shows the 5.0V-to-2.5V transition 162 in an enlarged view. One can see that the step-down transition is substantially completed in about 2.5 μs. One can also see that the 2.5V LDO's recovery back to the 2.5V level is relatively fast, at about 10 μs.

In FIG. 10, the lower panel shows a trace of the inductance current as a function of time for L0 in the example of FIG. 6, and the upper panel shows a trace of the output ripple voltage. The inductance L0 (e.g., approximately 6.8 μH) is being charged and discharged at a rate of about 1.4 MHz. Example values of C0, C1, and C2 are 1 μF, 10 μF, and 10 μF, respectively. For such an inductance current profile, one can see that the output ripple voltage has a peak-to-peak variation of about 33 mV which is relatively small. It will be understood that other values of L0, C0, C1 and C2 can also be utilized.

Figure 11:
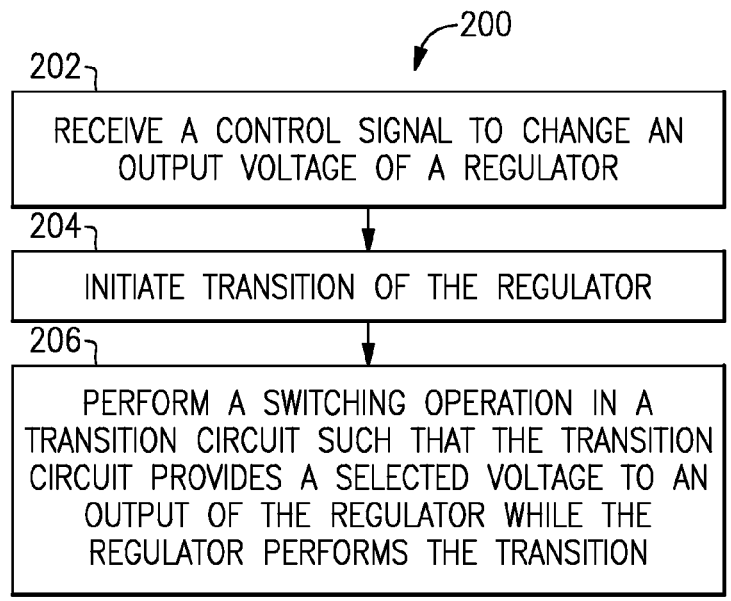
FIG. 11 shows a process that can be implemented to change an output voltage of a regulator.

FIG. 11 shows a process 200 that can be implemented to change an output voltage of a regulator. In block 202, a control signal can be received for changing an output voltage of a regulator. In block 204, transition of the regulator can be initiated. In block 206, a switching operation can be performed in a transition circuit such that the transition circuit provides a selected voltage to an output of the regulator while the regulator performs the transition. In some embodiments, the selected voltage can be the same voltage as the target of the transition of the regulator.

Figure 12:
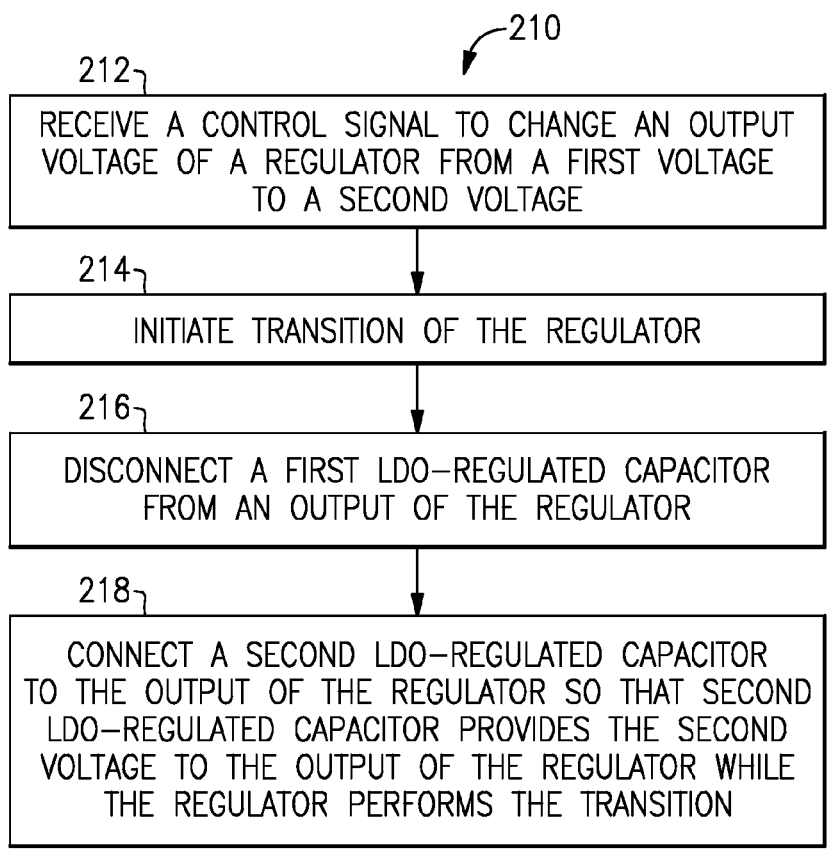
FIG. 12 shows a process that can be a more specific example of the process of FIG. 11.

FIG. 12 shows a process 210 that can be a more specific example of the process 200 of FIG. 11. In block 212, a control signal can be received for changing an output voltage of a regulator from a first voltage to a second voltage. In some embodiments, such a regulator can be, for example, a buck regulator. In block 214, transition of the regulator can be initiated. In block 216, a first LDO-regulated capacitor can be disconnected from an output of the regulator. In block 218, a second LDO-regulated capacitor can be connected to the output of the regulator so that the second LDO-regulated capacitor provides the second voltage to the output of the regulator while the regulator performs the transition.

Figure 13:
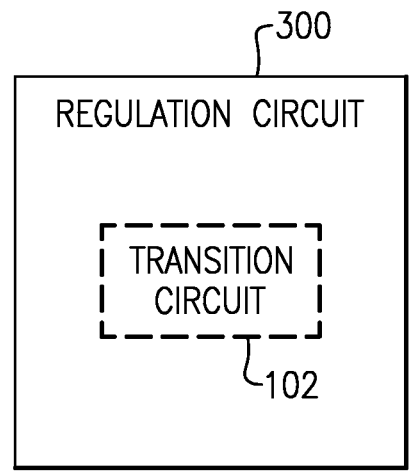
FIG. 13 shows that in some embodiments, a transition circuit having one or more features as described herein can be implemented in a regulation circuit.

FIG. 13 shows that in some embodiments, a transition circuit 102 having one or more features as described herein can be implemented in a regulation circuit 300. Such a regulation circuit can be based on, for example, a buck regulator, a boost regulator, a buck-boost regulator, etc.

Figure 14:
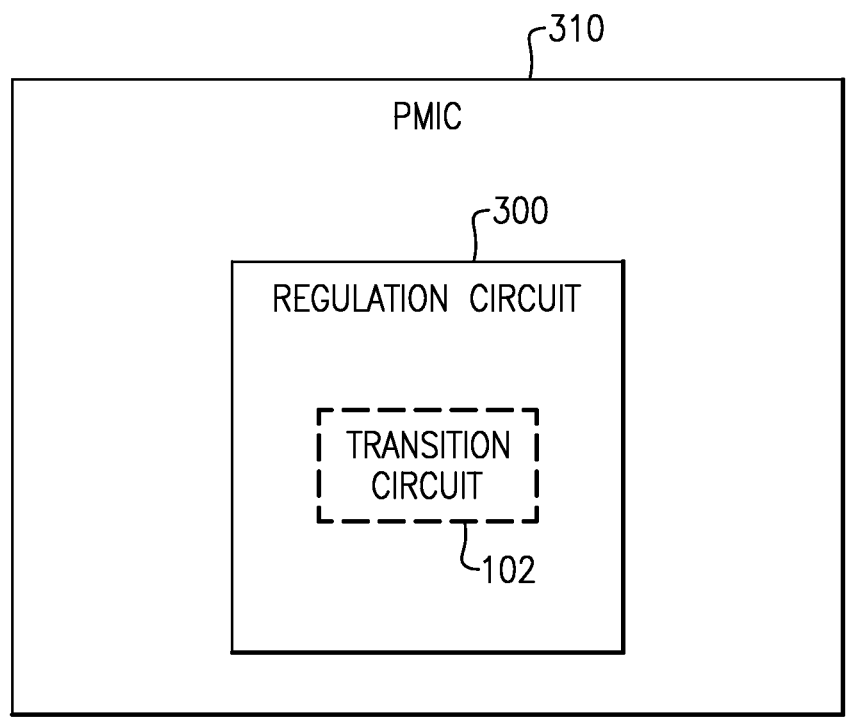
FIG. 14 depicts a power management integrated circuit (PMIC) that includes a regulation circuit having one or more features as described herein.

The regulation circuit 300 can be implemented as a standalone discrete device, as part of an integrated circuit (IC) device or system such as a power management integrated circuit (PMIC), and any combination thereof. FIG. 14 depicts a PMIC 310 that includes a regulation circuit 300. The regulation circuit 300 is shown to include a transition circuit 102 having one or more features as described herein.

In some embodiments, the PMIC 310 of FIG. 14 can be implemented on a single chip, and can include one or more regulation circuits. In some embodiments, such a PMIC can be configured to be used in devices including, for example, wireless devices such as cellular phones, or any devices that utilize voltage regulators.

In some implementations, a device and/or a circuit having one or more features described herein can be included in an RF device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 15:
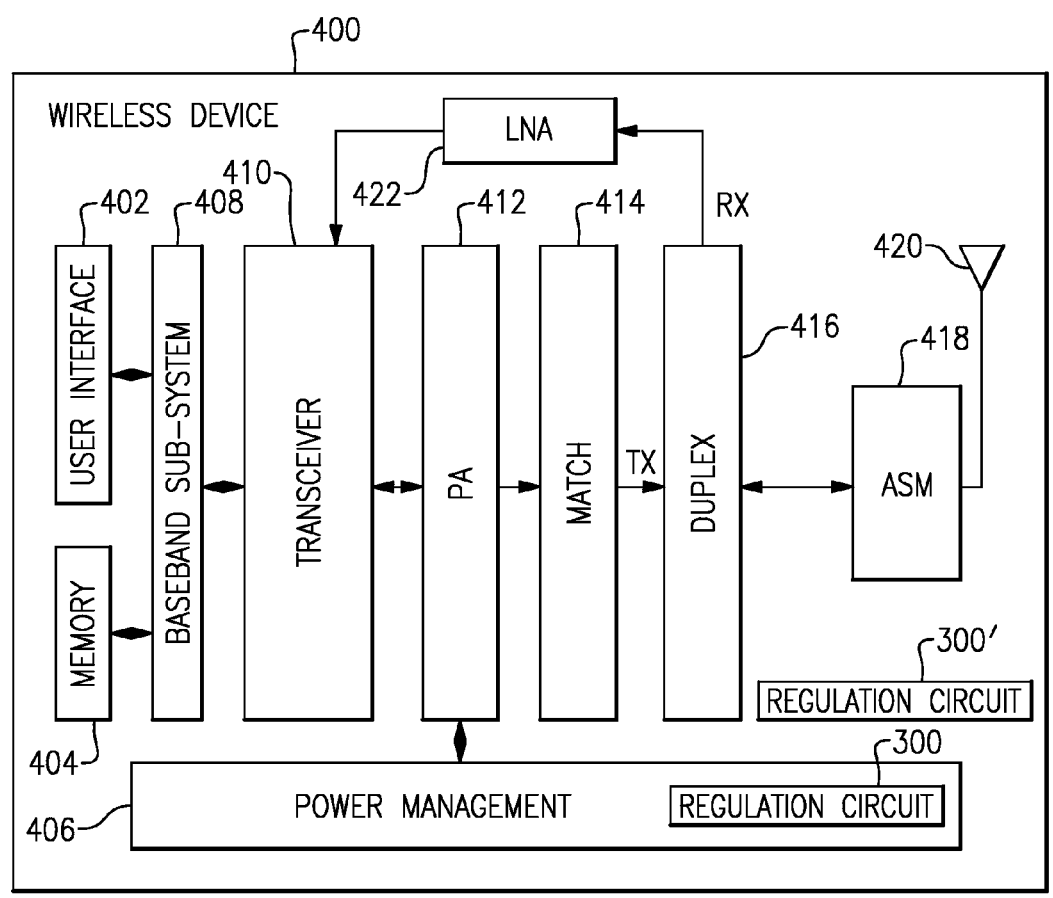
FIG. 15 depicts an example wireless device having one or more advantageous features described herein.

FIG. 15 depicts an example wireless device 400 having one or more advantageous features described herein. In some embodiments, a transceiver 410 can be configured and operated to generate RF signals to be amplified and transmitted, and to process received signals. One or more power amplifiers (PAs) 412 can receive their respective RF signals from the transceiver 410 and amplify such RF signals for transmission. The amplified outputs of the PAs 412 are shown to be matched (via one or more matching circuits 414) and routed to an antenna 420 via their respective duplexer(s) 416 and an antenna switch module (ASM) 418.

In some embodiments, the duplexer(s) 416 can allow transmit and receive operations to be performed simultaneously using a common antenna (e.g., 420). In FIG. 15, received signals are shown to be routed to one or more "RX" paths that can include, for example, one or more low-noise amplifiers (LNAs) 422. Received signals amplified by the LNA(s) 422 are shown to be routed to the transceiver 410 for further processing.

In FIG. 15, the transceiver 410 is shown to interact with a baseband sub-system 408 that is configured to provide conversion between data and/or voice signals suitable for a user and RF signals suitable for the transceiver 410. The transceiver 410 is also shown to be connected to a power management component 406 that is configured to manage power for the operation of the wireless device.

The baseband sub-system 408 is shown to be connected to a user interface 402 to facilitate various input and output of voice and/or data provided to and received from the user. The baseband sub-system 408 can also be connected to a memory 404 that is configured to store data and/or instructions to facilitate the operation of the wireless device, and/or to provide storage of information for the user.

In the example of FIG. 15, the power management component 406 can be implemented as a PMIC that includes a regulation circuit 300 having one or more features as described herein. In some embodiments, a regulation circuit 300' can also be implemented as a standalone device outside of the PMIC.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A voltage regulation system comprising:
   a voltage regulator configured to receive an input voltage Vin and generate an output voltage Vout at an output node, the voltage regulator further configured to transition Vout between V1 and V2; and
   a transition circuit coupled to the output node, the transition circuit including a first voltage source that is switchably coupled to the output node, the first voltage source configured to provide a voltage associated with one of the V1 and V2 voltages to the output node during at least the transition of the voltage regulator, and including a second voltage source, each of the first voltage source and the second voltage source including a capacitance regulated by a low-dropout (LDO) regulator such that the capacitance is pre-charged to a respective voltage by the LDO regulator.

2. The voltage regulation system of claim 1 wherein the voltage provided by the first voltage source is substantially equal to one of the V1 and V2 voltages.

3. The voltage regulation system of claim 2 wherein the first voltage source is further configured to continue to provide the voltage to the output node when the transition of Vout of the voltage regulator is substantially complete.

4. The voltage regulation system of claim 2 wherein the second value V2 is greater than the first value V1.

5. The voltage regulation system of claim 4 wherein the first voltage source is configured to provide the V2 voltage to the output node during a step-up transition from V1 to V2.

6. The voltage regulation system of claim 5 wherein the second voltage source of the transition circuit is switchably coupled to the output node, the second voltage source configured to provide the V1 voltage to the output node during a step-down transition from V2 to V1.

7. The voltage regulation system of claim 1 wherein the voltage regulator includes a buck regulator having an output inductance and an output capacitance.

8. The voltage regulation system of claim 7 wherein each LDO-regulated capacitance is greater than the output capacitance.

9. The voltage regulation system of claim 8 wherein each LDO-regulated capacitance is greater than the output capacitance by a factor of 10 or more.

10. The voltage regulation system of claim 8 wherein each LDO-regulated capacitance being greater than the output capacitance allows Vout to reach a target voltage of V2 or V1 substantially faster than by the transition of the voltage regulator.

11. The voltage regulation system of claim 10 wherein the faster reaching of V2 or V1 for Vout is achieved without involving a large current through the output inductance.

12. The voltage regulation system of claim 11 wherein the faster reaching of V2 or V1 for Vout is achieved in approximately 2 μs or less for a transition involving a voltage change of at least 2.5V.

13. The voltage regulation system of claim 7 wherein the first voltage source is connected to the output node and the second voltage source is disconnected from the output node when the voltage regulator transitions from V1 to V2, and when the voltage regulator is outputting V2 as Vout.

14. The voltage regulation system of claim 7 wherein the first voltage source is disconnected from the output node and the second voltage source is connected to the output node when the voltage regulator transitions from V2 to V1, and when the voltage regulator is outputting V1 as Vout.

15. The voltage regulation system of claim 1 wherein the voltage regulation system is configured to provide Vout as a supply voltage for one or more power amplifiers (PAs).

16. A method for regulating voltage, the method comprising:
    receiving an input voltage Vin by a voltage regulator and generating an output voltage Vout at an output node; and
    receiving a control signal to transition Vout between V1 and V2;
    operating the voltage regulator to effectuate the transition of Vout between V1 and V2; and
    providing a voltage associated with one of the V1 and V2 voltages from a transition circuit to the output node during at least the transition of the voltage regulator, the transition circuit including a first voltage soruce and a second voltage source, each of the first voltage source and the second voltage source including a capacitance regulated by a low-dropout (LDO) regulator such that the capacitance is pre-charged to a respective voltage by the LDO regulator.

17. The method of claim 16 wherein the providing of one of the V1 and V2 voltages from the transition circuit to the output node results in a faster transition of Vout than a transition of the voltage regulator without the voltage provided by the transition circuit.

18. A wireless device comprising:
a transceiver configured to process RF signals;
an antenna in communication with the transceiver, the antenna configured to facilitate transmission and receiving of respective RF signals; and
a voltage regulation circuit implemented to regulate a voltage signal that facilitate the transmission and/or receiving of the RF signals, the regulation circuit including a voltage regulator configured to receive an input voltage Vin and generate an output voltage Vout at an output node, the voltage regulator further configured to transition Vout between V1 and V2, the regulation circuit further including a transition circuit coupled to the output node, the transition circuit including a first voltage source that is switchably coupled to the output node, the first voltage source configured to provide a voltage associated with one of the V1 and V2 voltages to the output node during at least the transition of the voltage regulator, the transition circuit further including a second voltage source, each of the first voltage source and the second voltage source including a capacitance regulated by a low-dropout (LDO) regulator such that the capacitance is pre-charged to a respective voltage by the LDO regulator.

19. The wireless device of claim 18 further comprising a power amplifier configured to amplify an RF signal for transmission, the PA configured to receive a supply voltage based on the output voltage of the voltage regulation circuit.

20. The wireless device of claim 18 wherein the second voltage source of the transition circuit is switchably coupled to the output node, the second voltage source configured to provide the V1 voltage to the output node during a step-down transition from V2 to V1.

* * * * *